United States Patent [19]

Kennel et al.

[11] Patent Number: 4,809,771
[45] Date of Patent: Mar. 7, 1989

[54] LIH THERMAL STORAGE CAPSULE/HEAT EXCHANGER

[75] Inventors: Elliot B. Kennel; Edward T. Mahefkey, both of Dayton; Jerry E. Beam, Beavercreek, all of Ohio

[73] Assignee: The United States of America as represented by the Secretary of the Air Force, Washington, D.C.

[21] Appl. No.: 41,956

[22] Filed: Apr. 24, 1987

[51] Int. Cl.⁴ .............................................. F28D 17/00
[52] U.S. Cl. ........................................ 165/10; 165/41; 165/104.11; 126/400
[58] Field of Search ................. 165/10, 104.17, 104.11; 126/400; 62/48

[56] References Cited

U.S. PATENT DOCUMENTS

| | | | |
|---|---|---|---|
| 4,355,627 | 10/1982 | Scarlata | 126/400 |
| 4,361,182 | 11/1982 | Michalak | 165/10 |
| 4,459,976 | 7/1984 | Speros | 126/449 |
| 4,513,053 | 4/1985 | Chen et al. | 165/104.17 |
| 4,657,067 | 4/1987 | Rapp et al. | 126/400 |

FOREIGN PATENT DOCUMENTS

| | | | |
|---|---|---|---|
| 43153 | 4/1977 | Japan | 165/10 |
| 920349 | 4/1982 | U.S.S.R. | 165/10 |
| 1083068 | 3/1984 | U.S.S.R. | 165/10 |

*Primary Examiner*—Albert W. Davis, Jr.
*Attorney, Agent, or Firm*—Fredric L. Sinder; Donald J. Singer

[57] ABSTRACT

A thermal storage apparatus for use with space-based burst power supplies. Lithium hydride is encapsulated within spherical hollow capsules. Each capsule is made of a three layer hollow shell. The inner layer of each shell is molybdemum, the middle layer silicon carbide, and the outer layer molybedum. The lithium hydride occupies only about sixty percent of the interior volume of each capsule at ambient temperatures to allow for thermal expansion. The outer diameter of each capsule is 3 cm. The thickness of the layers is 0.1 mm for the inner and outer layer, and 0.3-0.5 mm for the middle layer. The capsules are arranged in a packed array for use in heat storage. A heat transfer working fluid, such as lithium, sodium or potassium, transfers heat to and from the packed array.

18 Claims, 2 Drawing Sheets

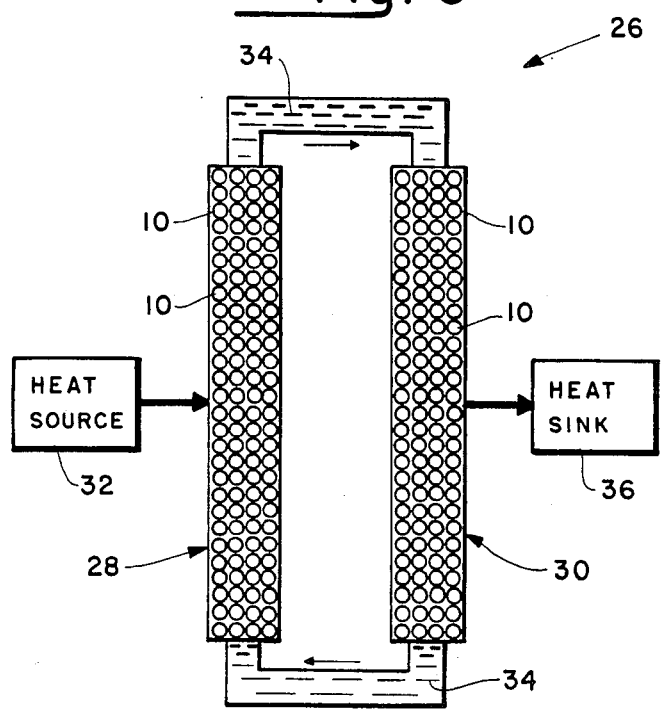

LIH THERMAL STORAGE CAPSULE/HEAT EXCHANGER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to heat storage systems, and more specifically to a very high capacity heat sink suitable for storing waste heat from a space-based burst power suppy.

Space-based burst power supplies will produce multimegawatt outputs for several hundreds of seconds. State of the art radiators to dissipate the waste heat from those power supplies are too heavy for use in space. Open cycle systems are more lightweight but, among other problems, the thrust from their exhaust plumes will require elaborate thrust cancellation devices to work in space. Closed cycle systems that temporarily store the waste heat from a burst power supply and slowly release the stored thermal energy during an off period are a possible solution. That solution requires a heat sink material able to absorb very large amounts of thermal energy. Lithium hydride is a good candidate for use as the heat sink material, having both a very high heat capacity and a very high heat of fusion. Co-pending application Ser. No. 24,447 by Kennel, one of the applicants for the present invention, demonstrates the successful use of lithium hydride in a closed cycle space-based nuclear reactor. The thermal energy stored in the lithium hydride during an on period is released through a radiator during an off period.

Unfortunately, lithium hydride conducts heat poorly and expands greatly upon melting, making high heat transfer rates and containment difficult to achieve. Further, containment of lithium hydride requires a hydrogen overpressure, necessitating containment of both free hydrogen and free lithium. Free hydrogen is generally difficult to contain. It will embrittle, corrode, or otherwise damage many materials, especially materials, such as niobium, that are particularly compatible with lithium.

Stainless steel or titanium, as shown in Kennel's nuclear reactor, will contain free hydrogen, but must be made relatively thick to do so, adding unwanted weight.

It is, therefore, a principal object of the present invention to provide a heat storage system using lithium hydride which both safely contains and provides a high rate of heat transfer to and from the lithium hydride.

It is another object of the present invention to provide a heat storage system using lithium hydride that is light in weight.

SUMMARY OF THE INVENTION

The present invention provides a thermal storage system using lithium hydride as the heat sink material. The unique discovery of the present invention is that small, lightweight, lithium-compatible and hydrogen impermeable spheres for encapsulating lithium hydride can be made by placing a thin layer of refractory metal on the inner and outer surfaces of a ceramic spherical shell. The high surface area-to-volume ratio of the spheres provides high heat transfer rates and their small size reduces the forces of expansion.

Accordingly, the present invention is directed to a thermal storage apparatus comprising a generally spherically shaped hollow shell containing a heat sink material wherein the hollow shell comprises an inner shell layer of metal, a middle shell layer of ceramic, and an outer shell layer of metal. The inner and outer shell layers may be molybdenum and the middle shell layer silicon carbide.

The invention additionally is directed to a thermal storage apparatus comprising a generally spherically shaped hollow shell containing lithium hydride. The hollow shell has a layered construction that is compatible with lithium hydride and free lithium on its inner surface, is impermeable to hydrogen, and is compatible with a heat transfer working surface on its outer surface. The hollow shell may comprise three layers made of an inner shell layer of metal, a middle shell layer of ceramic, and an outer shell layer of metal. The inner shell layer may be a refractory metal, the middle shell layer a ceramic, and the outer shell layer a refractory metal. The refractory metal of the inner and outer layers may be molybdenum and the middle shell layer of ceramic may be silicon carbide. The hollow shell has a preferred outer diameter of about 3 cm. The thickness of the inner shell layer is about 0.1 mm, the middle shell layer about 0.3 to about 0.5 mm and the outer shell layer about 0.1 mm.

The invention includes having the lithium hydride at about 60% of its theoretical maximum density at ambient temperatures inside the hollow shell.

The invention further includes a packed array of the hollow shells and the method of using the packed array to store thermal energy.

DESCRIPTION OF THE DRAWINGS

The present invention will be more clearly understood from a reading of the following detailed description in conjunction with the accompanying drawings wherein.

DETAILED DESCRIPTION

Figure 1:
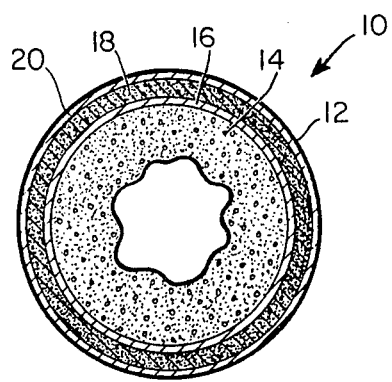
FIG. 1 is a cross-sectional view of a thermal storage capsule incorporating the teachings of the present invention.

Referring now to FIG. 1 of the drawings, there is shown a cross-sectional view of a thermal storage capsule 10, alternatively referred to as a sphere 10. Sphere 10 comprises a spherical shell 12 containing lithium hydride 14. Shell 12 comprises three layers: an inner layer 16 of molybdenum, a middle layer 18 of silicon carbide and an outer layer 20 of molybdenum. FIG. 1 shows lithium hydride 14 in its solid phase occupying at ambient temperatures approximately sixty percent of the interior volume of capsule 10 to allow for expansion during heating. Experience has shown that voids will form in the center of thermal storage devices as long as the liquid phase can wet the inner wall.

Thermal storage capsule 10 has an outer diameter of 3 cm. Inner shell layer 16 and outer shell layer 18 are each 0.1 mm thick. Middle layer 18 is about 0.3–0.5 mm thick. The molybdenum of inner layer 16 provides compatibility with the lithium hydride and any free lithium.

The molybdenum of outer layer 20 maintains compatibility with a heat transfer working fluid such as lithium, sodium or potassium. The silicon carbide of middle layer 18 is impermeable to free hydrogen and provides structural strength with light weight. Molybdenum and silicon carbide are additionally particularly suitable for this application because their similar coefficients of thermal expansion reduces thermal shock.

Figure 2:
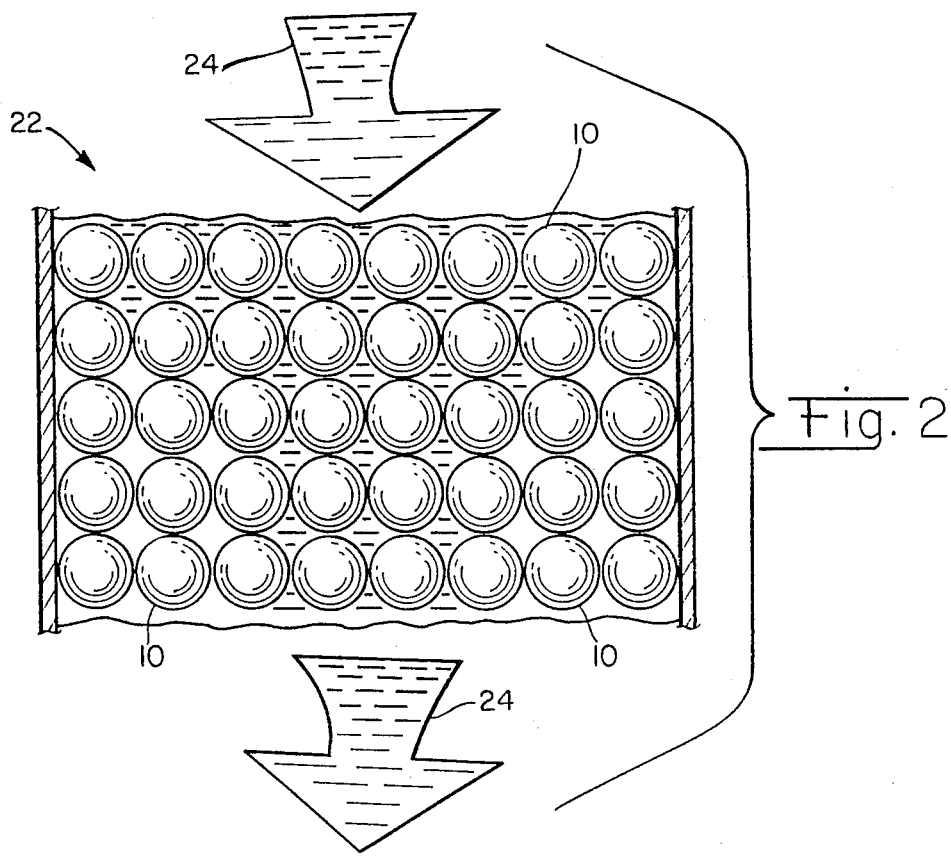
FIG. 2 is a simplified cross-sectional view of part of a packed array of thermal storage capsules; and, FIG. 3 is a representative view of a heat exchanger incorporating the teachings of the present invention.

FIG. 2 shows part of a packed array 22, or bed, of thermal storage capsules 10. Heat transfer working fluid 24 passes between and over capsules 10 to pass heat either to or from the capsules. The use of a very large number of spheres 10 in a packed array combines the advantages of the high heat capacity and high heat of fusion of lithium hydride with the high heat transfer rates provided by the high surface area to volume provided by the spheres. A packed array of spheres 10 will typically be kept at an ambient temperature of 300° K. before heating and allowed to rise in temperature to 1100° K. Liquid metals such as sodium, lithium or potassium are preferred for the heat transfer working fluid.

FIG. 3 is a representative view of a heat exchanger 26 incorporating the teachings of the present invention. Heat exchanger 26 comprises a loop between two thermal exchange modules 28 and 30 made of a packed array of thermal energy storage capsules 10. A heat source 32, such as the space-based nuclear reactor described in the previously referenced co-pending application, transfers waste heat to thermal exchange module 28. A heat transfer working fluid 34 circulates to transfer waste heat from thermal exchange module 28 to thermal exchange module 30. Thermal exchange module 30 then more slowly transfers the waste heat to heat sink 36. In the case of a space-based nuclear reactor, heat sink 36 would be a radiator. Thermal storage module 28 can both store the waste heat of the nuclear reactor during pulsed on operation, and exchange it to thermal storage module 30, at a fast enough rate to allow the nuclear reactor to operate at full power. Thermal storage module 30 will continously dissipate the stored waste heat to radiator heat sink 36 during both on and off periods.

The present invention can also be used to store solar energy for use on a satellite. The packed bed would absorb heat, chiefly through heat of fusion, during the hot side of an orbit and return it through a Brayton or Rankine cycle to produce electricity during the dark side of an orbit.

The disclosed thermal energy storage system successfully demonstrates the use of lithium hydride encapsulated in a specially fabricated capsule as the heat sink material. Though the disclosed use is specialized, it will find application in other areas where a particular material, chosen as a heat sink or for other physical properties, has other physical properties which interfere with its desired use. It will also find application where light weight containment of chemically active materials is desired.

Those with skill in the art will see that other materials may be substituted for the molybdenum and silicon carbide used in the disclosed embodiment. Silicon nitride will be a good substitute for silicon carbide, as may other ceramics. Other high temperature refractory metals such as tungsten may be substituted for molybdenum. The term refractory metals also includes similar high temperature metal alloys.

It is understood that other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A thermal storage apparatus for transferring and storing heat energy to and from a heat transfer working fluid, comprising a generally spherically shaped hollow shell containing a heat sink material, wherein the hollow shell comprises:
   (a) an inner shell layer of metal;
   (b) a middle shell layer of ceramic; and,
   (c) an outer shell layer of metal.

2. A thermal storage apparatus for transferring and storing heat energy to and from a heat transfer working fluid, comprising a generally spherically shaped hollow shell containing lithium hydride, wherein the hollow shell has a layered construction that is compatible with lithium hydride and free lithium on its inner surface, is impermeable to hydrogen and is compatible with the heat transfer working fluid on its outer surface.

3. The thermal storage apparatus according to claim 2, wherein the hollow shell comprises:
   (a) an inner shell layer of metal compatible with lithium hydride and free lithium;
   (b) a middle shell layer of ceramic impermeable to free hydrogen;
   (c) an outer shell layer of metal compatible with the heat transfer working fluid; and,
   (d) wherein the coefficients of thermal expansion of the inner, middle and outer shell layers are generally similar.

4. The thermal storage apparatus according to claim 2, wherein the hollow shell comprises:
   (a) an inner shell layer of metal;
   (b) a middle shell layer of ceramic; and,
   (c) an outer shell layer of metal.

5. The thermal storage apparatus according to claim 2, wherein the hollow shell comprises:
   (a) an inner shell layer of refractory metal;
   (b) a middle shell layer of ceramic; and,
   (c) an outer shell layer of refractory metal.

6. The thermal storage apparatus according to claim 2, wherein:
   (a) the inner shell layer comprises molybdenum;
   (b) the middle shell layer comprises silicon carbide; and,
   (c) the outer shell layer comprises molybdenum.

7. The thermal storage apparatus according to claim 6, wherein:
   (a) the outer diameter of the hollow shell is about 2 cm;
   (b) the inner shell layer is about 0.1 mm thick;
   (c) the middle shell layer is about 0.3 to about 0.5 mm thick; and,
   (d) the outer shell layer is about 0.1 mm thick.

8. The thermal storage apparatus according to claim 2, wherein the lithium hydride is at about 60% of its theoretical maximum density at ambient temperatures inside the hollow shell.

9. A thermal storage system for transferring and storing heat energy to and from a heat transfer working fluid, comprising a packed array of generally spherically shaped hollow shells containing lithium hydride, wherein each hollow shell has a layered construction that is compatible with lithium hydride and free lithium on its inner surface, is impermeable to hydrogen and is compatible with the heat transfer working fluid on its outer surface.

10. The thermal storage system according to claim 9, wherein each hollow shell comprises:
   (a) an inner shell layer of metal compatible with lithium hydride and free lithium;
   (b) a middle shell layer of ceramic impermeable to free hydrogen;
   (c) an outer shell layer of metal compatible with the heat transfer working fluid; and,
   (d) wherein the coefficients of thermal expansion of the inner, middle and outer shell layers are generally similar.

11. The thermal storage system according to claim 9, wherein each hollow shell comprises:
   (a) an inner shell layer of metal;
   (b) a middle shell layer of ceramic; and,
   (c) an outer shell layer of metal.

12. The thermal storage system according to claim 9, wherein each hollow shell comprises:
   (a) an inner shell layer of refractory metal;
   (b) a middle shell layer of ceramic; and,
   (c) an outer shell layer of refractory metal.

13. The thermal storage system according to claim 12, wherein:
   (a) the inner shell layer comprises molybdenum;
   (b) the middle shell layer comprises silicon carbide; and,
   (c) the outer shell layer comprises molybdenum.

14. The thermal storage system according to claim 13, wherein:
   (a) the outer diameter of each hollow shell is about 3 cm;
   (b) each inner shell layer is about 0.1 mm thick;
   (c) each middle shell layer is about 0.3 to about 0.5 mm thick; and,
   (d) each outer shell layer is about 0.1 mm thick.

15. The thermal storage system according to claim 9, wherein the lithium hydride is at about 60% of its theoretical maximum density at ambient temperatures inside each hollow shell.

16. A method of storing thermal energy, comprising the steps of:
   (a) encapsulating lithium hydride inside a plurality of generally spherical hollow shells, each shell comprising:
      (i) an inner shell layer of metal;
      (ii) a middle shell layer of ceramic; and,
      (iii) an outer shell layer of metal;
   (b) arranging the hollow capsules into a packed array;
   (c) providing a source of heat; and,
   (c) flowing a heat transfer working fluid from the source of heat through the packed array of hollow shells.

17. The method of storing thermal energy according to claim 16, wherein:
   (a) the inner shell layer of metal is molybdenum;
   (b) the middle shell layer of ceramic is silicon carbide; and,
   (c) the outer shell layer of metal is molybdenum.

18. A thermal storage apparatus for transferring and storing heat energy to and from a heat transfer working fluid, comprising a generally spherically shaped hollow shell containing a heat sink material, wherein the hollow shell comprises:
   (a) an inner shell layer of molybdenum;
   (b) a middle shell layer of silicon carbide; and,
   (c) an outer shell layer of molybdenum.

* * * * *

UNITED STATES PATENT AND TRADEMARK OFFICE
CERTIFICATE OF CORRECTION

PATENT NO. : 4,809,771

DATED : March 7, 1989

INVENTOR(S) : Elliot B. Kennel et al

It is certified that error appears in the above-identified patent and that said Letters Patent is hereby corrected as shown below:

On the title page and col. 1, lines 1-2.
In the Title, "LIH" should read --LiH--.
Col 4, line 53, "2" should read --3--.

Signed and Sealed this

Twenty-second Day of December, 1992

*Attest:*

DOUGLAS B. COMER

*Attesting Officer*     *Acting Commissioner of Patents and Trademarks*